United States Patent
Grant et al.

(10) Patent No.: US 9,823,833 B2
(45) Date of Patent: Nov. 21, 2017

(54) METHOD AND APPARATUS FOR HAPTIC ENABLED FLEXIBLE TOUCH SENSITIVE SURFACE

(75) Inventors: Danny A. Grant, Montreal (CA); Juan Manuel Cruz Hernandez, Montreal (CA); Christophe Ramstein, San Francisco, CA (US)

(73) Assignee: Immersion Corporation, San Jose, CA (US)

( * ) Notice: Subject to any disclaimer, the term of this patent is extended or adjusted under 35 U.S.C. 154(b) by 1378 days.

(21) Appl. No.: 11/758,638

(22) Filed: Jun. 5, 2007

(65) Prior Publication Data
US 2008/0303782 A1 Dec. 11, 2008

(51) Int. Cl.
*G06F 3/0488* (2013.01)
*G06F 1/16* (2006.01)
*G06F 3/01* (2006.01)

(52) U.S. Cl.
CPC .......... *G06F 3/0488* (2013.01); *G06F 1/1615* (2013.01); *G06F 1/1624* (2013.01); *G06F 1/1643* (2013.01); *G06F 1/1652* (2013.01); *G06F 3/016* (2013.01); *G06F 2203/04102* (2013.01)

(58) Field of Classification Search
CPC .. G06F 3/016; G06F 3/0412; G06F 2203/014; G06F 2203/04102; G06F 3/0488; G06F 1/1615; G06F 1/1624; G06F 1/1643; G06F 1/1652; G09G 2380/02
USPC ........ 345/156, 173–178; 715/701; 340/407.1
See application file for complete search history.

(56) References Cited

U.S. PATENT DOCUMENTS

| | | | |
|---|---|---|---|
| 4,330,730 A * | 5/1982 | Kurz et al. | 310/331 |
| 6,337,678 B1 | 1/2002 | Fish | |
| 6,429,846 B2 | 8/2002 | Rosenberg et al. | |
| 6,803,924 B1 * | 10/2004 | Snibbe et al. | 715/701 |
| 6,819,304 B2 * | 11/2004 | Branson | 345/1.3 |
| 6,819,312 B2 | 11/2004 | Fish | |
| 7,196,688 B2 * | 3/2007 | Schena | 345/156 |
| 2002/0044132 A1 | 4/2002 | Fish | |
| 2002/0108439 A1 | 8/2002 | Whitehead | |

(Continued)

FOREIGN PATENT DOCUMENTS

| | | |
|---|---|---|
| JP | 2000-148393 | 5/2000 |
| JP | 2003-060251 | 2/2003 |

(Continued)

OTHER PUBLICATIONS

E-ink Electronic Paper Displays, 3 pages.

(Continued)

*Primary Examiner* — Keith Crawley
(74) *Attorney, Agent, or Firm* — Medler Ferro Woodhouse & Mills PLLC

(57) ABSTRACT

A method and apparatus for an electronic interactive device having a haptic enabled flexible touch sensitive surface are disclosed. In one embodiment, the electronic interactive device includes a flexible touch sensitive surface, a flexible screen (or display), and an actuator. The flexible touch sensitive surface is deposited over the flexible screen and is capable of receiving an input, such as, for example, from a user. The flexible screen displays an image via a displaying window. The actuator is coupled to the flexible screen and provides haptic feedback in response to the input.

37 Claims, 10 Drawing Sheets

(56) References Cited

U.S. PATENT DOCUMENTS

| | | | |
|---|---|---|---|
| 2002/0130673 A1* | 9/2002 | Pelrine et al. | 324/727 |
| 2003/0174121 A1 | 9/2003 | Poupyrev et al. | |
| 2003/0179190 A1* | 9/2003 | Franzen | 345/173 |
| 2004/0041800 A1* | 3/2004 | Daniels | 345/204 |
| 2004/0056876 A1* | 3/2004 | Nakajima | 345/702 |
| 2004/0217877 A1* | 11/2004 | Kokonaski et al. | 340/815.4 |
| 2004/0233161 A1* | 11/2004 | Shahoian et al. | 345/156 |
| 2005/0030292 A1* | 2/2005 | Diederiks | 345/173 |
| 2005/0040962 A1 | 2/2005 | Funkhouser et al. | |
| 2005/0057528 A1* | 3/2005 | Kleen | 345/173 |
| 2006/0022952 A1* | 2/2006 | Ryynanen | G06F 3/016 345/173 |
| 2006/0099808 A1 | 5/2006 | Kondo | |
| 2006/0194619 A1 | 8/2006 | Wilcox et al. | |
| 2006/0211217 A1* | 9/2006 | Xu et al. | 438/455 |
| 2006/0274036 A1* | 12/2006 | Hioki et al. | 345/156 |
| 2007/0211036 A1* | 9/2007 | Perkins | 345/173 |
| 2008/0261057 A1* | 10/2008 | Slobodin | 428/447 |
| 2008/0266273 A1* | 10/2008 | Slobodin et al. | 345/174 |
| 2008/0297878 A1* | 12/2008 | Brown et al. | 359/263 |

FOREIGN PATENT DOCUMENTS

| | | |
|---|---|---|
| JP | 2003-280546 | 10/2003 |
| JP | 2003-288158 | 10/2003 |
| JP | 2004-071765 | 3/2004 |
| JP | 2005-114796 | 4/2005 |
| JP | 2006-154380 | 6/2006 |
| JP | 2007-121765 | 5/2007 |

OTHER PUBLICATIONS

Xerox Electronic Reusable Paper, 2 pages.
Fujitsu's Film Substrate-Based Bendable Color Electronic Paper Featuring Image Memory Function, 3 pages.
NEC's Flexible Battery, 3 pages.
Philips Screen, 3 pages.
Siemens Wafer-Thin Color Displays for Packaging, 2 pages.
Visual Planet: Touch Foil, 5 pages.
Extended European Search Report as issued for European Patent Application No. 08747171.0, dated Jun. 30, 2010.
Examination Report as issued in European Patent Application No. 08747171.0, dated Jun. 21, 2011.
Notification of Reason for Refusal as issued for Japanese Patent Application No. 2010-511230, dated Oct. 30, 2012.

* cited by examiner

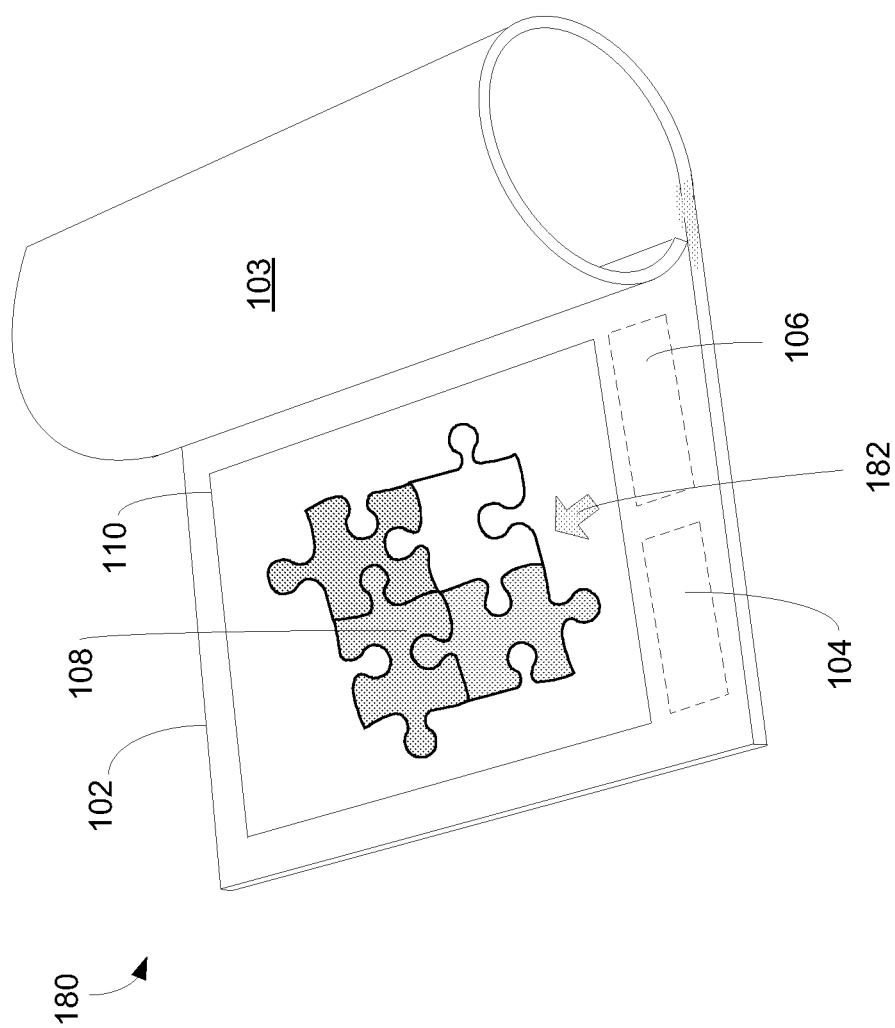

METHOD AND APPARATUS FOR HAPTIC ENABLED FLEXIBLE TOUCH SENSITIVE SURFACE

FIELD OF THE INVENTION

The present invention relates to the field of electronic interface devices. More specifically, the present invention relates to a user interface device with haptic feedback.

BACKGROUND OF THE INVENTION

As computer-based systems, appliances, automated teller machines (ATM), point of sale terminals and the like have become more prevalent in recent years, the ease of use of the human-machine interface is becoming more and more important. Such interfaces should operate intuitively and with little or no training so that they may be employed by virtually anyone. Many conventional user interface devices are available on the market such as the key board, the mouse, the joystick, and the touch screen. One of the most intuitive and interactive interface devices known is the touch panel, which can be a touch screen or a touch pad. A touch screen includes a touch sensitive input panel and a display device, usually in a sandwich structure and provides a user with a machine interface through touching a panel sensitive to the user's touch and displaying content that the user "touches." A conventional touch pad is a small planar rectangular pad, which can be installed near a display, on a computer, an automobile, ATM machines, and the like.

A conventional touch-sensitive component of a touch panel employs various types of touch sensing technology such as capacitive sensors, pressure sensors and the like as known in the art to detect locations being pressed on the panel. For example, a user contacts a region of a touch-screen commonly with a fingertip to emulate a button press and/or moves his or her finger on the panel according to the graphics displayed behind the panel on the display device.

A problem associated with conventional touch panels associated with recently developed flexible displays is that they lack the capability of providing interactive acknowledgements to indicate whether an intended input has been accepted or rejected.

Accordingly, there is a need for a touch panel or surface to provide an interactive feedback to indicate whether a user's selection has been accepted or rejected and/or other appropriate or desirable effects.

SUMMARY OF THE INVENTION

A method and apparatus for an electronic interactive device having a flexible display with haptic feedback are disclosed. In one embodiment, the electronic interactive device includes a flexible touch sensitive surface, a flexible screen (or display), and an actuator. The flexible touch sensitive surface is deposited over the flexible screen and is capable of receiving an input from a user. The flexible screen displays an image via a displaying window. The actuator, which is coupled to the flexible screen, provides haptic feedback in response to the input.

Additional features and benefits of the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1E illustrates an electronic interactive device having a rollable flexible screen and a haptic enabled flexible touch sensitive surface with a fine input resolution in accordance with one embodiment of the present invention;

DETAILED DESCRIPTION

Figure 1A:
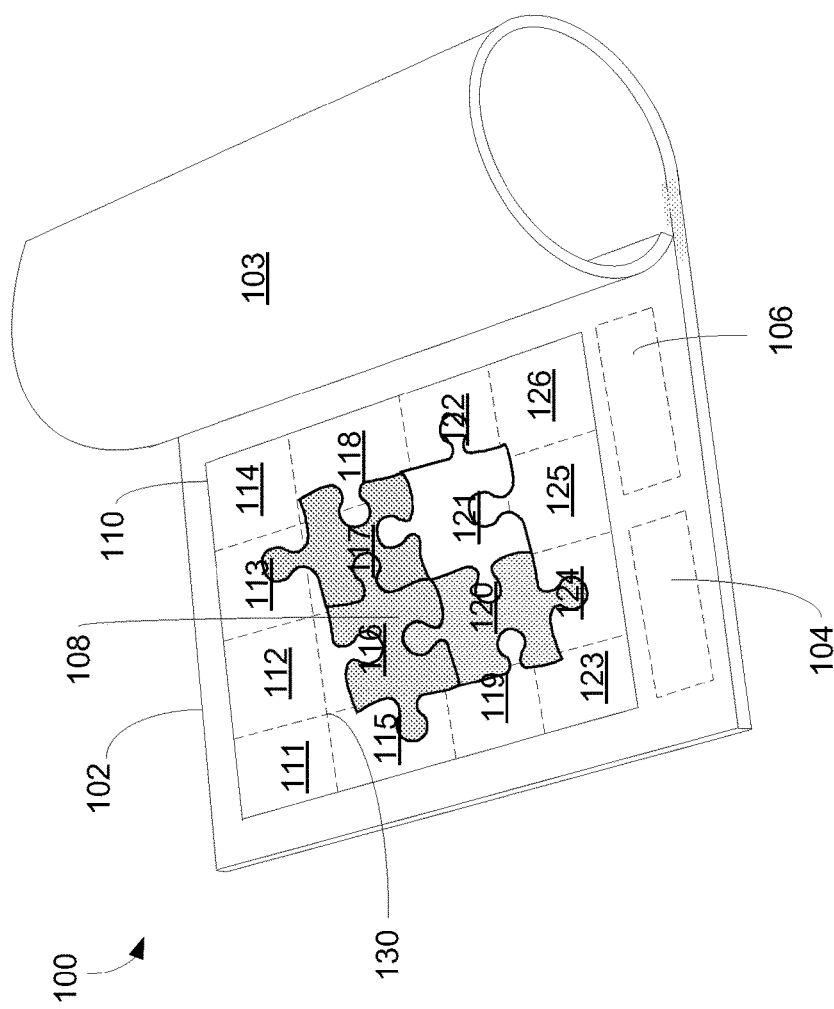
FIG. 1A illustrates an electronic interactive device having a rollable flexible screen and a haptic enabled flexible touch sensitive surface in accordance with one embodiment of the present invention.

A method and device for a flexible display having a haptic enabled flexible touch sensitive surface are disclosed.

Embodiments of the present invention are described herein in the context of a method, system and apparatus for communication including a haptic enabled flexible touch sensitive surface. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the standard hardware and routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The present invention discloses an electronic interactive device having a haptic enabled flexible touch sensitive surface. Haptic feedback can also be referred to as tactile effect, tactile feedback, haptic effect, force feedback, or vibrotactile feedback. In one embodiment, the electronic interactive device includes a flexible touch sensitive surface, a flexible screen (or display), and an actuator. By flexible it is meant that gross deformations are possible with the touch panel as opposed to slight flexures that occur in current touch screens. The flexible screen, for example, can be a rollable display, a foldable display, or a bendable display. A rollable display is a case where a bendable display is capable of bending back on itself to form a roll. The flexible touch sensitive surface can also be a flexible touch panel, a flexible touch sensitive pad, a flexible touch keyboard, or a flexible touch display. The surface of flexible touch sensitive surface is divided into multiple regions wherein each region is capable of sensing a touch or contact on the region by a user. Alternatively, the surface of flexible touch sensitive surface is a continuous borderless input screen with fine input resolution.

The flexible touch sensitive surface generates an input in accordance with the particular region, which senses the touch, and the graphic displaying content that the user "touches". The actuator, which can be a flexible actuator, is configured to provide haptic feedback in response to the input. In another embodiment, the electronic interactive device also includes a flexible battery and a flexible chip. The flexible battery or power supply is used for supplying power to the device while the flexible chip is used for processing data.

Turning now to the figures, FIG. 1A illustrates an electronic interactive device 100 having a rollable flexible screen and a haptic enabled flexible touch sensitive surface in accordance with one embodiment of the present invention. Interactive device 100 includes a flexible or a rollable screen having an open portion 102 and a rolled-up portion 103. In one embodiment, open portion 102 is configured to have a display window for displaying images 108. Rolled-up portion 103, on the other hand, is configured to be inactive for conserving power. In an alternative embodiment, open portion 102 is configured to be opaque, which is capable of providing haptic feedback in response to an input.

In another embodiment, the display window extents to the entire flexible screen including both open portion 102 and rolled-up portion 103 although rolled-up portion 103 usually can not be viewed and/or touched. In other words, the display window does not change regardless of the flexible position or status of the rollable display. The flexible position or status indicates the flexible condition of the rollable display in which it identifies whether the display is in a rolled-up condition, in a partially rolled-up condition, and so forth. It should be noted that the rollable display could be an electronic paper, an e-paper, a digital paper, an electronic ink, or a power paper.

A rollable display is an electronic display capable of displaying images and the display can be rolled up into a tube or a scroll. The rollable display is designed to mimic the appearance and the physical properties of regular paper. Unlike a conventional display, the rollable display looks and acts like an ordinary sheet of paper, and it is capable of holding displaying images for a long period of time with limited or no power consumption. The shape of the rollable display may be changed from a planar (or flat) to a rolled up (or a tube) shape. An advantage of the rollable display (such as electronic paper) is lightweight, durable, and flexible.

An example of rollable display, which can be employed in the present invention, is a Gyricon™ sheet, which is a type of electronic paper developed at the Xerox PARC™ (Palo Alto Research Center). The Gyricon™ sheet has similar physical properties as a traditional sheet of paper except that it can be rewritten many times. The Gyricon™ technology is essentially a technique of manipulating millions of small toner particles in a thin layer of transparent plastic wherein the toner particles are arranged in response to an application of voltage patterns. The image displayed by the Gyricon™ sheet will be maintained until new voltage patterns are applied. It should be noted that other flexible display technologies for manufacturing rollable displays may be available, such as organic light-emitting diode (OLED) and/or organic/polymer TFT (Thin Film Transistor), which may be used to manufacture flexible displays.

Referring back to FIG. 1A, the flexible touch sensitive surface is deposited over the rollable display thereby a user can use his or her fingertips to contact a region of the flexible touch sensitive surface to emulate a button press according to the graphics displayed behind the region on the flexible display device. In one embodiment, the flexible touch sensitive surface is further configured to dynamically adjust effective touch sensitive surface 110 in accordance with the displaying window of the rollable display. In order for a user to correctly touch an intended region on effective touch sensitive surface 110, the user needs to see the graphics displayed behind the region from the rollable display. As such, matching the size of effective touch sensitive surface 110 to the display window is, in one embodiment, desirable.

The flexible touch sensitive surface is further configured to divide its touchable or contactable area into multiple regions 111-126 separated by borders 130. Each region of the flexible touch sensitive surface is used to accept an input when a region is touched or pressed by a user. Conversely, the flexible touch sensitive surface rejects a user's input when a border 130 is touched.

The flexible position or status of the rollable display, in one embodiment, identifies the rollable status of a rollable flexible screen in real-time since a user may continuously fold or unfold the flexible display just as, for example, folding or unfolding a page of newspaper. The size of effective touch sensitive surface 110 is adjusted by activating and/or deactivating regions in accordance with the value of flexible position. In other words, the flexible position identifies what percent of the display is rolled up and what percent of display is open. Flexible position is used to determine the actual size of display window and effective touch sensitive surface 110. For example, the flexible position, as shown in FIG. 1A, should indicate that an approximately fifty percent (50%) of the rollable display is in an open position 102 while other fifty percent (50%) of the rollable display is in a rolled up (or closed) position 103. Since a user cannot see and touch the image displayed by rolled-up portion 103, effective touch sensitive surface 110, in one embodiment, is not extend into rolled-up portion 103.

The display window of a rollable flexible screen, in one embodiment, can be set to the full size as the rollable display regardless of whether the display is in a rolled up position. If the size of effective touch sensitive surface 110 tracks with the size of display window, the size of effective touch sensitive surface 110 is adjusted according to the size of display window. As such, the flexible touch sensitive surface could extend effective touch sensitive surface 110 to the entire flexible screen if the display window is set to the entire flexible screen. The size of effective touch sensitive surface 110, in another embodiment, is configured to be set in accordance with the flexible position although the display window is extended to the entire rollable display. The display window, in an alternative embodiment, is configured to be dynamically set and/or rearranged in response to the flexible position. As FIG. 1A illustrated, while rolled-up portion 103 is turned off, open portion 102 contains effective touch sensitive surface 110 and display window, which displays images 108.

Device 100 further includes an actuator, not shown in FIG. 1A. Depending on the orientation, the actuator can excite either in-plane or out-of-plane motion with respect to effective touch sensitive surface 110 for haptic sensation. In addition to traditionally mechanical based actuators, the present invention also employs a flexible actuator or flexible actuators. A flexible actuator may be a fiber (or nanotube) of electroactive polymers ("EAP"), a strip of piezoelectric element, and/or a fiber of shape memory alloy ("SMA"). For example, EAP, also known as biological muscles or artificial muscles, is capable of changing its shape in response to an application of voltage. The physical shape of an EAP may be deformed when it sustains large force. EAP may include Electrostrictive Polymers, Dielectric elastomers, Conducting Polyers, Ionic Polymer Metal Composites, Responsive Gels, Bucky gel actuator or any combination of the above-mentioned EAP materials.

Piezoelectric elements are another type of flexible actuators that can be used in the present invention. Piezoelectric element may be manufactured in a fiber-like device, a strip-like device or a film-like layer. The dimension of piezoelectric element can be expanded or shrunk depending on the applied voltage.

SMA, also known as memory metal, is another type of a flexible actuator wherein SMA could be made of copper-zinc-aluminum, copper-aluminum-nickel, nickel-titanium alloys, or a combination of copper-zinc-aluminum, copper-aluminum-nickel, and/or nickel-titanium alloys. Upon deforming from SMA's original shape, it regains its original shape in accordance with an ambient temperature and/or surrounding environment. It should be noted that the present invention may combine the EAP, piezoelectric elements, and/or SMA to achieve a specific haptic sensation.

Device 100 further includes a flexible battery 104 and a flexible chip 106. Because flexible battery 104 can be manufactured in an ultra-thin structure, it should have similar physical flexibility as the rollable display thereby they can be rolling up and/or unrolling without difficulty. Alternatively, instead of using flexible battery 104, device 100 includes a power supply, which is capable of generating sufficient power for device 100 to operate. In one embodiment, the power supply includes an array of solar cells or photovoltaic cells, wherein solar cells, for example, are capable of converting light energy into electrical energy. Flexible chip 106, also known as flexible electronics and/or flexible circuitry, may be used in device 100, and it can be rolled up like a window shade, a tube, or a scroll. While flexible chip 106 provides data processing capability for electronic interactive device 100, flexible battery supplies the power to device 100.

During an operation, electronic interactive device 100, in one embodiment, identifies and monitors its flexible position and displays graphic images on a rollable display in accordance with the flexible position. Effective touch sensitive surface 110 is subsequently defined and activated in response to the flexible position. When one of regions 111-126 is touched, a haptic feedback is generated by an actuator in accordance with the region that is touched. It should be noted that different haptic feedbacks may be generated for different regions of the flexible touch sensitive surface.

Figure 1B:
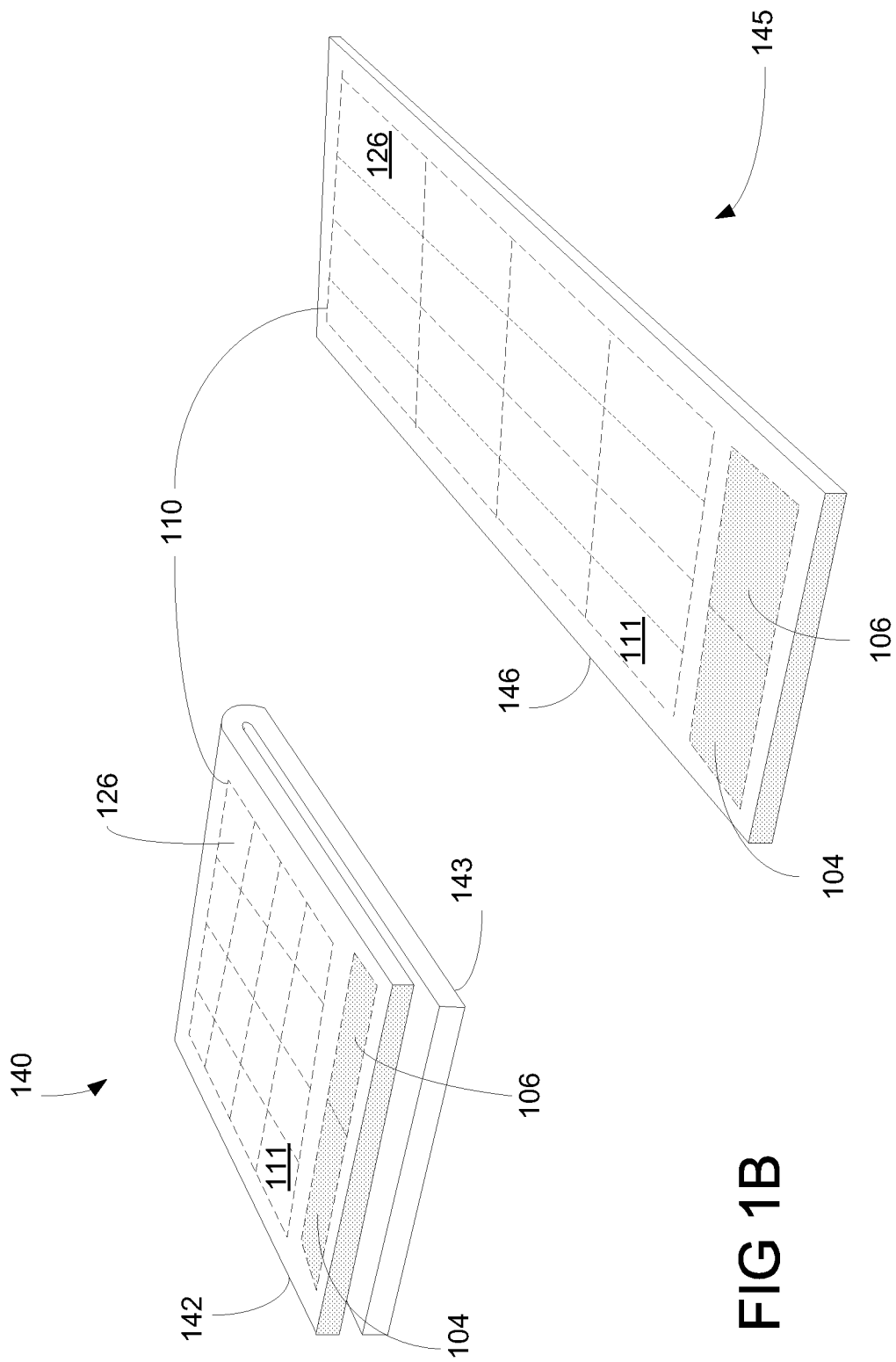
FIG. 1B illustrates an electronic interface device having a foldable display and a haptic enabled flexible touch sensitive surface in accordance with one embodiment of the present invention.

FIG. 1B illustrates an electronic interface device 140 having a foldable flexible screen and a haptic enabled flexible touch sensitive surface in accordance with one embodiment of the present invention. Device 140 includes an open portion 142 and a fold portion 143 wherein open portion 142 is capable of displaying images. Folded portion 143 is folded behind open portion 142 and, in one embodiment, does not display any images since it can not be viewed. Alternatively, folded portion 143 is configured to display images even though these images can not be viewed and touched. Device 140 is a paper-like flexible electronic device including a layer of a foldable display and a layer of a flexible touch sensitive surface. The foldable display could be an electronic paper, an e-paper, a digital paper, an electronic ink, electronic reusable paper, or a power paper.

Similar to a rollable display, a foldable display is capable of displaying images through its display window. The foldable display can be folded into a smaller displaying device in which the display window should be adjusted accordingly, as shown in FIG. 1B. For example, a foldable display is designed to mimic the physical properties of a regular piece of paper. Unlike a conventional display, the foldable display acts as an ordinary paper and it is capable of retaining displaying information (or images) for a long period of time with limited power consumption. In one embodiment, the display window of device 140 is capable of continuously adjusting in response to actions of folding and unfolding of device 140 by a user. An advantage of a foldable display (such as electronic paper) is lightweight, durable, and flexible, which is almost as flexible as a regular piece of paper. As discussed above, various technologies involving in manufacturing rollable displays can also be used to manufacture foldable displays.

Referring back to FIG. 1B, a flexible touch sensitive surface is deposited over the foldable display. It should be noted that the flexible touch sensitive surface may be a separate layer that is adjacent to the screen. In one embodiment, the flexible touch sensitive surface is organized in a plurality of regions 111-126, and at least a set of regions forms an effective touch sensitive surface 110. In one embodiment, device 140 dynamically adjusts the size of effective touch sensitive surface 110 in accordance with the flexible position of foldable flexible screen 140. The flexible position determines whether the foldable display is in a folding position or in an unfolding position. It should be noted that the flexible position also indicates the size of a viewable and touchable displaying window on the foldable display. For example, the flexible position, as illustrated in FIG. 1B, indicates an approximately a fifty percent (50%) folding position of device 140, which further indicates that the size of the display window is also adjusted to about half of the device 140. In one embodiment, effective touch sensitive surface 110 is also adjusted to the size of the display window.

Device 140 is configured to dynamically adjust the size of display window on the foldable display according to the flexible position. Various sensors are installed on device 140 and sensors are used to determine the flexible position. While the foldable display projects images on the display window of open portion 142, the foldable display ignores or turns off folded portion 143. The size of effective touch sensitive surface 110 is adjusted in accordance with the display window.

Referring back to FIG. 1B, device 145 illustrates a foldable display that is in a flat or planar position. The display window of device 145 extends to the entire foldable display. Similarly, the flexible touch sensitive surface also extends effective touch sensitive surface 110 to the entire screen, which includes both open portion 142 and folded portion 143 of device 140. It should be noted that device 140 or 145 also includes a flexible actuator, flexible battery, and/or flexible chips. To confirm a receipt of an intended input, actuators generate haptic feedback when a user touches a region of the flexible touch sensitive surface.

During an operation, device 140, in one embodiment, identifies and monitors its flexible position and displays graphic images on the folded display in accordance with the flexible position. Effective touch sensitive surface 110 is subsequently defined and activated in response to the flexible position. When one of regions 111-126 is touched, a haptic feedback is generated by an actuator to confirm that the region is touched. It should be noted that different haptic feedbacks may be generated for different regions of the flexible touch sensitive surface.

Figure 1C:
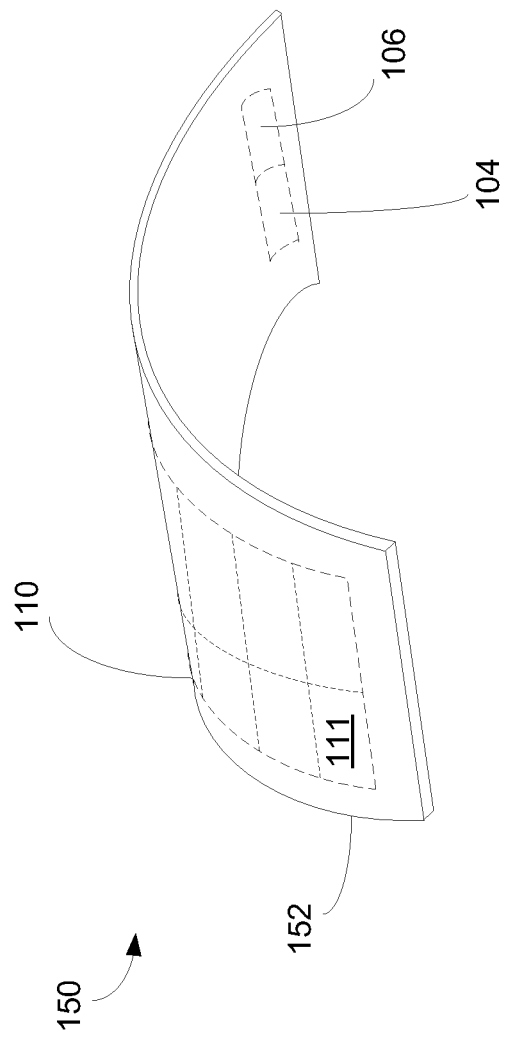
FIG. 1C illustrates an interface device having a bendable display and a haptic enabled flexible touch sensitive surface in accordance with one embodiment of the present invention.

FIG. 1C illustrates an interface device 150 having a bendable flexible screen and a haptic enabled flexible touch sensitive surface in accordance with one embodiment of the present invention. Device 150, in one embodiment, includes a bendable display, a flexible touch sensitive surface, a flexible actuator, a flexible battery, and flexible circuitry. The bendable display, also known as an electronic paper, an e-paper, a digital paper, an electronic ink, electronic reusable paper, or a power paper, is capable of displaying images even if it is in a bending position. In an alternative embodiment, the bendable flexible screen is configured to be opaque, which is capable of providing haptic feedback in response to an input. An advantage of the bendable display (such as electronic paper) is lightweight, durable, and flexible.

A bendable display is designed to mimic the physical properties of a regular sheet of paper and is capable of retaining displaying information (or images) for a long period of time with limited power consumption. A feature of the bendable display is capable of projecting vivid color images and the quality of the images is typically unaffected when the display is bent. A bendable display, in another embodiment, further includes an image memory function, which provides continuous display of the same image without the power consumption. The bendable display also allows the shape of display to be bent as indicated in FIG. 1C. A method of manufacturing a bendable display is to use the technology of film substrate-based bendable color electronic paper with an image memory function. Furthermore, the technique of manufacturing the rollable displays, as discussed above, can also be used to manufacture the bendable displays.

Referring back to FIG. 1C, a flexible touch sensitive surface is deposited over the bendable display. In one embodiment, the flexible touch sensitive surface is arranged in a plurality of regions 111-126 wherein at least a set of regions forms an effective touch sensitive surface 110. Device 150, in one embodiment, sets the size of the display window to the entire bendable display and extends effective touch sensitive surface 110 to the entire flexible touch sensitive surface or the entire bendable display. The flexible actuator is used to provide haptic feedback while flexible battery 104 is the power source for device 150.

During an operation, when one of regions 111-126 of effective touch sensitive surface 110 is touched or pressed by a user, a haptic feedback is generated by an actuator to confirm the intended input. In one embodiment, a unique haptic feedback is initiated for a particular region of the flexible touch sensitive surface. The unique haptic feedback provides a confirmation message indicating which region or object has been touched.

Figure 1D:
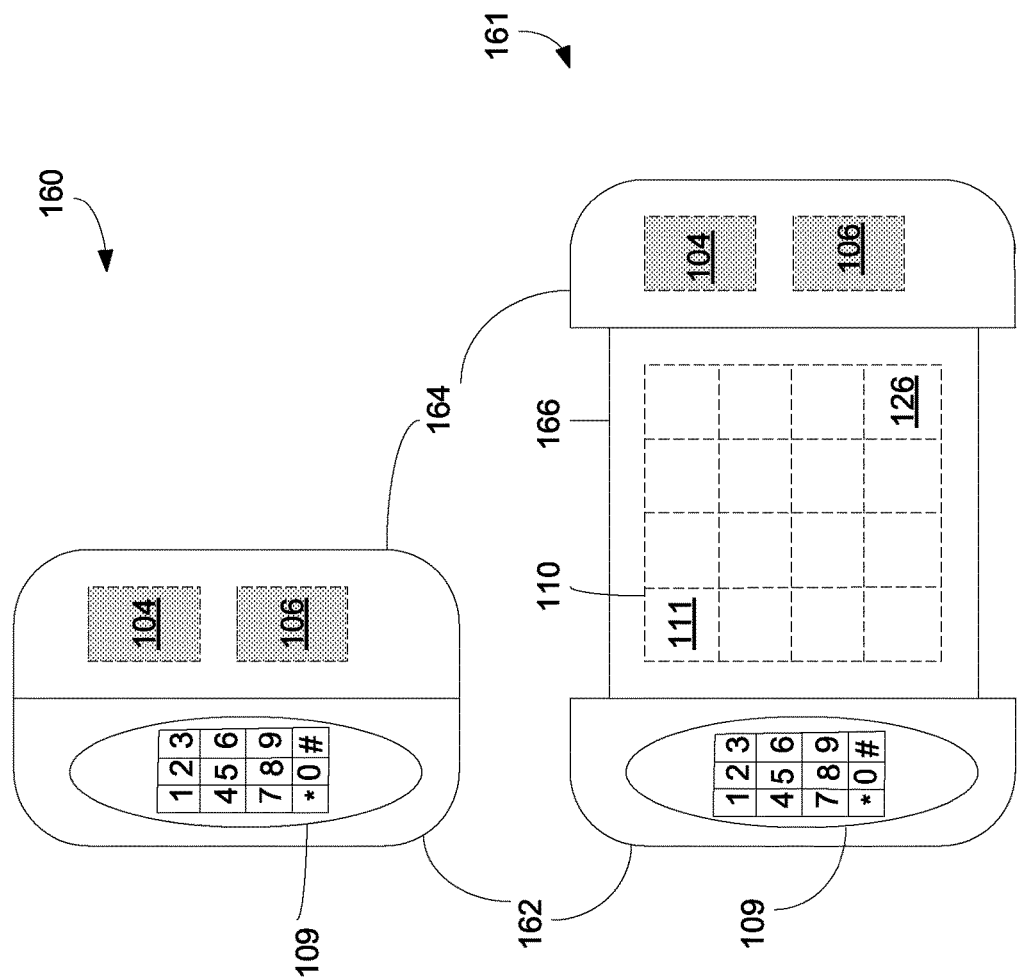
FIG. 1D illustrates a haptic handheld device with an expandable display and a flexible touch sensitive surface in accordance with one embodiment of the present invention.

FIG. 1D illustrates a haptic handheld device 160 with an expandable display in accordance with one embodiment of the present invention. In one embodiment, haptic handheld device 160 includes a first handle 162, a second handle 164, and a flexible display 166. Haptic handheld device 160 can be a cellular phone, a mobile device, a personal digital assistant ("PDA"), a video game, a pocket PC, et cetera. It should be noted that haptic handled device 160 is designed to be operated by hand(s). In another embodiment, only one handle, either first handle 162 or second handle 164, is necessary to perform the features of the present invention. Haptic handheld device 160 shows that flexible display 166 is stowed away and the device is in a closed position. Conversely, haptic handheld device 161 shows that flexible display 166 is fully extended and the device is in an open position.

Referring back to FIG. 1D, a flexible touch sensitive surface is deposited over flexible display 166. Alternatively, a portion of the flexible touch sensitive surface is deposited over flexible display 166 and another portion of the flexible touch sensitive surface is deposited over first handle 162. In another embodiment, the flexible touch sensitive surface is deposited over first handle 162, second handle 164, and flexible display 166. In yet another embodiment, the flexible touch sensitive surface is deposited over first handle 162.

First handle 162 further includes a key pad 109, which could be a portion of the flexible touch sensitive surface, and an actuator, not shown in FIG. 1D. Second handle 164 is configured to include a battery 104 and circuits 106. A set of conventional actuators may be installed in first handle 162 and/or second handle 164 for generating haptic feedback in response to inputs. The mechanical based actuator, which contains in one embodiment vibrotactile motors such as eccentric rotating mass ("ERM") or linear resonant actuators ("LRA"), can be installed in first handle 162 or second handle 164 or both. Alternatively, Eccentric Rotating mass or Linear Resonant Actuator flexible actuator may be incorporated in flexible display 166 to generate haptic feedback when effective touch sensitive surface 110 was touched.

Flexible display 166, in one embodiment, is a rollable display that can be stored between first and second handles 162-164 when it is not in use. Flexible display 166, also known as an electronic paper, an e-paper, a digital paper, an electronic ink, electronic reusable paper, or a power paper, is an electronic display capable of displaying images in a display window on flexible display 166. Haptic handheld device 160 or 161 allows the size of flexible display 166 to change according to the user's desire. It should be noted that the display window may vary depending on whether flexible display 166 is fully extended or half-way extended. As discussed above, the method of manufacturing the rollable display may be used to manufacture flexible display 166.

In one embodiment, effective touch sensitive surface 110 disposed over flexible display 166 is configured to be dynamically adjusted in accordance with the flexible position of flexible display 166. Various sensors and detecting circuitry are employed in haptic handheld device 160 to determine the flexible position of the flexible display 166. Alternatively, the display window of flexible display 166 is set to the full size of the flexible display 166 regardless of whether flexible display 166 is partially extended or fully extended.

Flexible display 166 enables a user to read messages, news, movies, email, navigation information, and/or interactive transactions which may be delivered and bought through wireless and/or wired communications network. Users will feel the haptic feedback when they touch or contact a region or regions of the flexible touch sensitive surface. Unique haptic feedback may be generated to indicate which region or regions had been touched. It should be noted that haptic handheld device 160 may contain additional circuits and components that are not necessary to understand the present invention.

FIG. 1E illustrates an alternative embodiment of an electronic interactive device 180 having a rollable flexible screen and a haptic enabled flexible touch sensitive surface in accordance with one embodiment of the present invention. Interactive device 180 includes a flexible or a rollable screen having an open portion 102 and a rolled-up portion 103. In one embodiment, open portion 102 is configured to have a display window for displaying images 108. Rolled-up portion 103, on the other hand, is configured to be inactive for conserving power. Alternatively, the display window extents to the entire flexible screen including both open portion 102 and rolled-up portion 103 although rolled-up portion 103 usually can not be viewed and/or touched.

The flexible touch sensitive surface is deposited over the rollable display thereby a user can use his or her fingertips to contact a region of the flexible touch sensitive surface to emulate a button press according to the graphics displayed behind the region on the flexible display device. The flexible touch sensitive surface is further configured to dynamically adjust effective touch sensitive surface 110 in accordance with the displaying window of the rollable display. In order for a user to correctly touch an intended region on effective touch sensitive surface 110, the user needs to see the graphics displayed behind the region from the rollable display. As such, matching the size of effective touch sensitive surface 110 to the display window is desirable.

Effective touch sensitive surface 110 includes high resolution input points that are configured to behave as a continuous borderless input region within surface 110. Surface 110, in one embodiment, includes an icon or a pointer 182, which is used to point where the input is made. In other words, icon 182 is used in a similar way as a mouse icon on a typical computer screen, in which a mouse click initiates an action in accordance with the location pointed by the mouse icon. Alternatively, when a user's finger moves over an object on the display, the object is highlighted in different color to indicate which object is selected for input.

During an operation, electronic interactive device 180, in one embodiment, identifies and monitors its flexible position and displays graphic images on a rollable display in accordance with the flexible position. Effective touch sensitive surface 110 is subsequently defined and activated in response to the flexible position. When an input point pointed by the pointed icon 182 is touched, a haptic feedback is generated by an actuator in accordance with the input point that is touched. It should be noted that different haptic feedbacks may be generated for different regions of the flexible touch sensitive surface.

Figure 2:
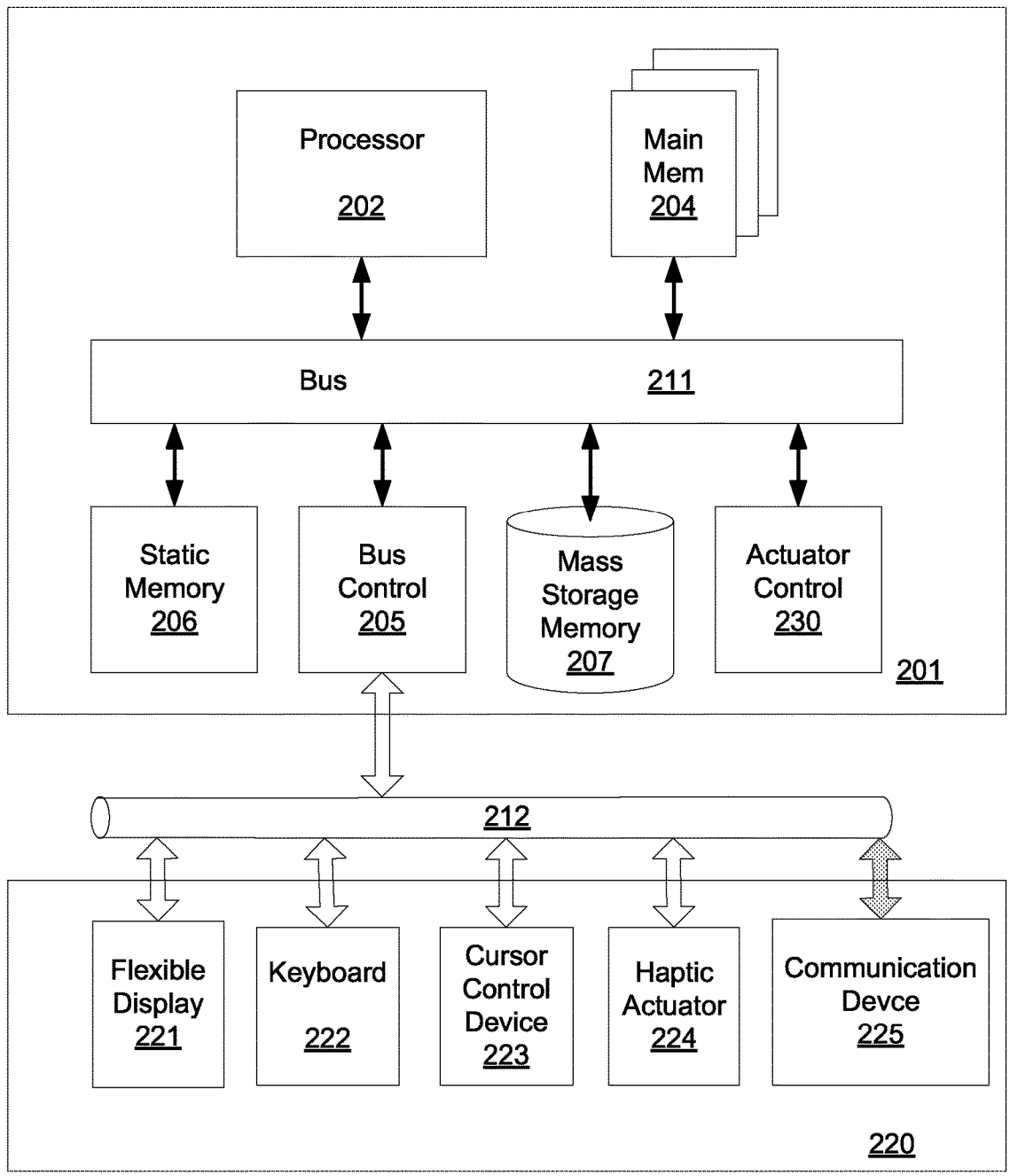
FIG. 2 illustrates a data processing system used in a flexible display with haptic feedback in accordance with one embodiment of the present invention.

Having briefly described several embodiments of flexible display devices or screens in which the present invention operates, FIG. 2 illustrates a data processing system 200, which may be used in an interactive device having a flexible display and haptic enabled flexible touch sensitive surface in accordance with one embodiment of the present invention. Computer system 200, which could be implemented in flexible chip 106, includes a processing unit 201, an interface bus 211, and an input/output ("IO") unit 220. Processing unit 201 includes a processor 202, a main memory 204, a system bus 211, a static memory device 206, a bus control unit 205, a mass storage memory 207, and an actuator control 230. Bus 211 is used to transmit information between various components and processor 202 for data processing. Processor 202 may be any of a wide variety of general-purpose processors or microprocessors such as Pentium™ microprocessor, Motorola™ 68040, or Power PC™ microprocessor. Actuator control 230 generates haptic feedback in response to user inputs.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to buses 211-212 and controls which component, such as main memory 204 or processor 202, can use the bus. Bus control unit 205 manages the communications between bus 211 and bus 212. Mass storage memory 207, which may be a magnetic disk, an optical disk, hard disk drive, floppy disk, CD-ROM, and/or flash memories for storing large amounts of data. Actuator control module 230, in one embodiment, is an independent component (IC) that performs functions of haptic effect control. A function of actuator control 230 is to drive one or more haptic actuators 224. In another embodiment, actuator control module 230 may reside within the processor 202, main memory 204, and/or static memory 206.

I/O unit 220, in one embodiment, includes a flexible display 221, keyboard 222, cursor control device 223, and communication device 225. Keyboard 222 may be a conventional alphanumeric input device for communicating information between computer system 200 and computer operator(s). Another type of user input device is cursor control device 223, such as a conventional mouse, touch mouse, trackball, a finger or other type of cursor for communicating information between system 200 and user(s). Communication device 225 is coupled to bus 211 for accessing information from remote computers or servers, such as server 104 or other computers, through wide-area network. Communication device 225 may include a modem or a wireless network interface device, or other similar devices that facilitate communication between computer 200 and the network.

Figure 3:
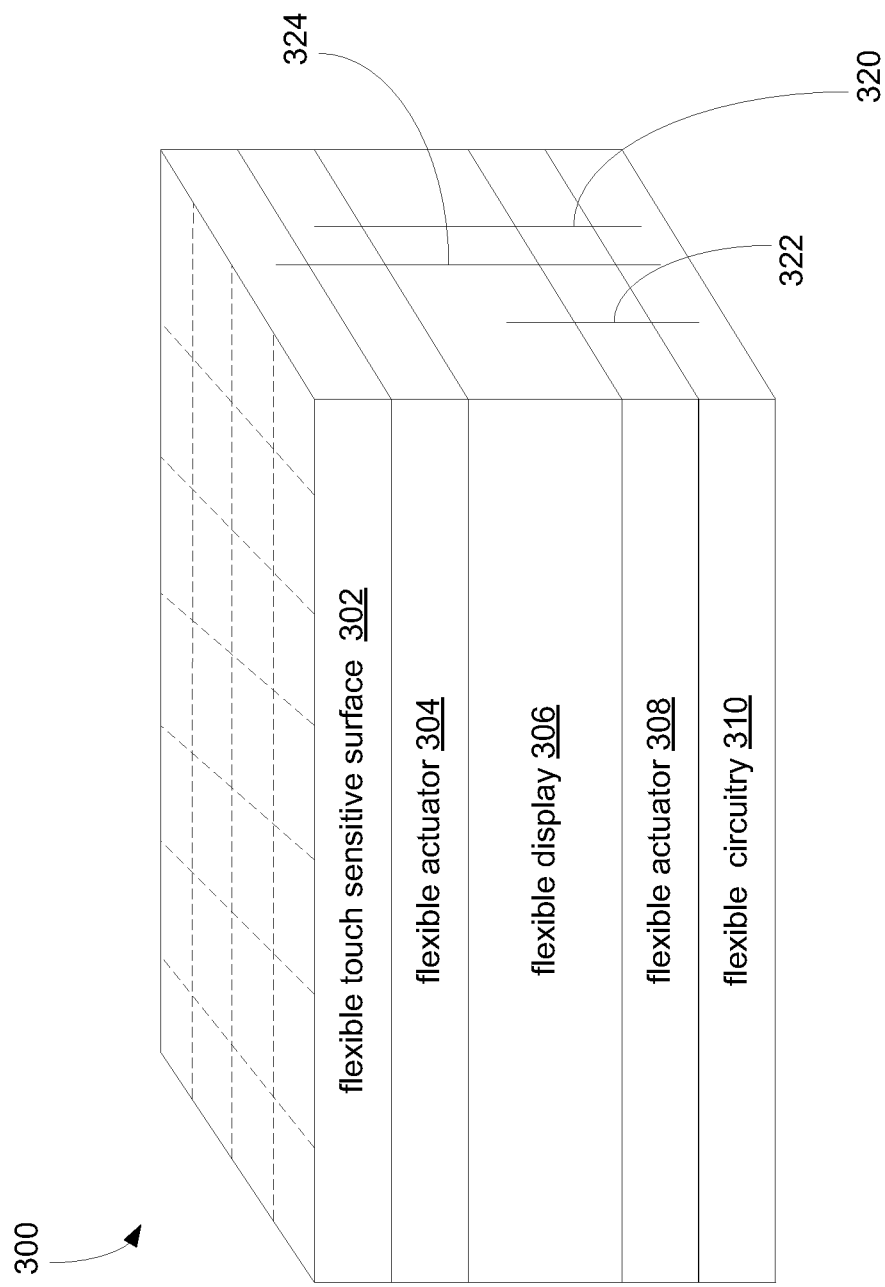
FIG. 3 is a side-view block diagram illustrating a structure of a flexible displaying device having multiple layers in accordance with one embodiment of the present invention.

FIG. 3 is a side-view block diagram illustrating a structure of a flexible displaying device 300 having multiple layers in accordance with one embodiment of the present invention. Flexible displaying device 300 includes a flexible touch sensitive surface 302, a first flexible actuator layer 304, a flexible display 306, a second flexible actuator layer 308, and a flexible circuitry layer 310. It should be noted that the thickness of each layer is not drawn to scale. Flexible touch sensitive surface 302, which is deposited over flexible display 306, is capable of receiving inputs from a user. Flexible touch sensitive surface 302, in one embodiment, is substantially transparent thereby the contents displayed by flexible display 306 can be viewed through flexible touch sensitive surface 302. As discussed earlier, flexible touch sensitive surface 302 is divided into multiple regions, wherein each region is configured to represent a specific function. For example, if a displaying image shown behind a region is a symbol of "quit", the current application is terminated if the region showing the "quit" symbol is touched. In an alternative embodiment, flexible touch sensitive surface 302, first flexible actuator layer 304, flexible display 306, second flexible actuator layer 308, and/or flexible circuitry layer 310 are combined and/or integrated into a single flexible touch sensitive display device.

Flexible actuator layer 304, in one embodiment, is placed between flexible touch sensitive surface 302 and flexible display 306 for generating haptic feedback. As mentioned earlier, flexible actuator layer 304 can be composed of EAPs, piezoelectric elements, and/or SMA. For example, thin strips of piezoceramic (or piezoelectric), SMA, and/or EAP may be interlaced with flexible display 306 or flexible touch sensitive surface 302 or both for creating haptic sensation. The strips of flexible actuator can either be made in a layer or multiple individual strips. Alternatively, the strips could be placed on the back side of flexible display 306 as flexible actuator layer 308. It should be noted that flexible actuator layer 308 and flexible actuator layer 304 can be substantially the same layer. Alternatively, one of flexible actuator layers 304 and 308 may be required in flexible display device 300. If the strips are anchored at several places on flexible display 306, the strips would create a vibration when they are activated. A single or multiple strips may be used to vibrate entire flexible display 306.

Flexible display 306 can either be a rollable display, a foldable display, or a bendable display. Flexible display 306, also known as an electronic paper, an e-paper, a digital paper, an electronic ink, electronic reusable paper, or a power paper, is capable of displaying images and capable of maintaining the images with limited power consumption. It should be noted that the physical property of flexibility of flexible display 306, flexible touch sensitive surface 302, and flexible circuitry layer 310 are substantially similar thereby they can be folded, rolled, or bent at the substantially same rate.

Flexible circuitry layer 310 includes various processing and computing components as discussed in FIG. 2. In one embodiment, upon receipt of input from flexible touch sensitive surface 302, flexible circuitry 310 receives the input signal via connection 324. Flexible circuitry 310 processes the input information and initiates haptic feedback in response to the input information via connection 320. Flexible display 306 receives image information for displaying from flexible circuitry 310 via connection 322. It should be noted that flexible display device 300 may contain other layers but they are not necessary to understand the present invention.

Figure 4:
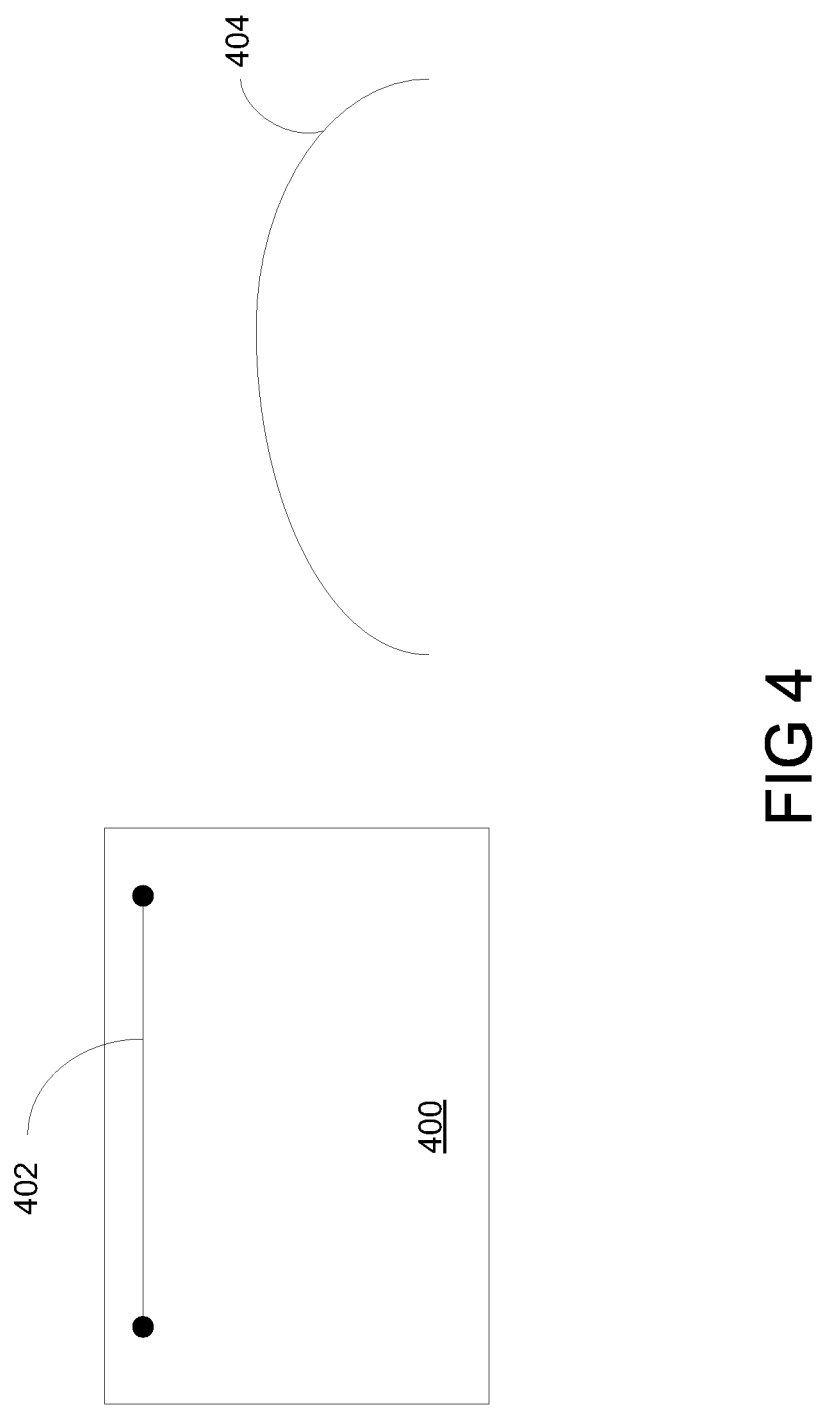
FIG. 4 illustrates a thin strip of flexible actuator attached to a flexible display in accordance with one embodiment of the present invention.

FIG. 4 illustrates a thin strip of flexible actuator 402 attached to a flexible display 400 in accordance with one embodiment of the present invention. The thin strip of flexible actuator 402 may be a strip of piezoelectric element or a fiber of SMA or EAP. In one embodiment, the fibers are very fine and they are almost invisible. Alternatively, the fibers can be made by the materials almost transparent or clear thereby the image from the flexible display can penetrate the fibers or a fiber layer.

Fiber 402 expands and contracts depending on the voltage applied. In one embodiment, when fiber 402 is activated, the entire screen vibrates. For example, the similar actuator materials can be used to local deform or bend the entire flexible screen. A fiber of SMA, for instance, decreases in length when it is activated. If an SMA fiber 402 is attached to both ends of display 400, fiber 402 can pull both ends of the flexible display 400 together and consequently flexible display 400 bows as shown bent flexible display 404. Depending on the amount of actuation the bowing can be macroscopic or perceived as a vibration.

Figure 5:
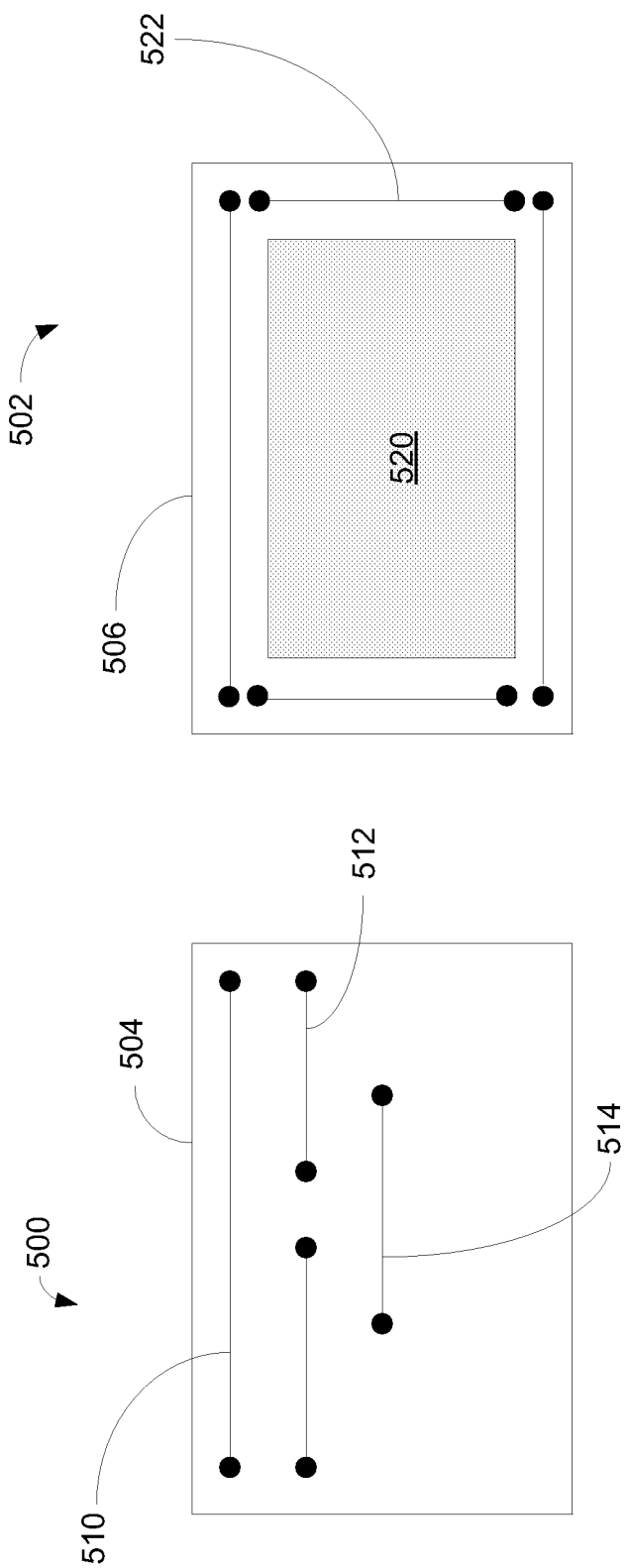
FIG. 5 illustrates an alternative embodiment of a flexible display device having multiple flexible actuators in accordance with one embodiment of the present invention.

FIG. 5 illustrates an alternative embodiment of a flexible display device 500 having flexible actuators in accordance with one embodiment of the present invention. Flexible display device 500 includes multiple strips (or fibers) of flexible actuators 510-514, which could be piezoelectric elements, SMA fibers, EAP nanotubes, or a combination of piezoelectric elements, SMA and EAP fibers. Each of multiple fibers 510-514 anchors (or attaches) at a different point of flexible display 504, and consequently, each of multiple fibers 510-514 delivers a unique vibrating function. For example, when fiber 514 shrinks (or contracts) due to the application of voltage, the middle portion of flexible display 504 starts to buckle (or warp). On the other hand, when fiber 512 shrinks, a portion of flexible display 504 buckles and causes various vibrations. The edge of flexible display 504 buckles when fiber 510 is activated. It should be noted that various different patterns of fibers can be anchored to flexible display 504 to achieve different haptic sensation.

Flexible display device 502 illustrates an alternative layout of various fibers to achieve the same or similar haptic sensations or feedback. Various fibers 522 are anchored along the edge of flexible display 506 and the advantage of this layout is to reduce the interference of image displayed in a display window 520. A unique fiber 522 or a combination of fibers 522 may be activated to generate a predefined haptic feedback. It should be noted that other types of layouts are available such as mesh design to achieve specific haptic feedback sensation.

The present invention includes various processing steps, which will be described below. The steps of the present invention may be embodied in machine or computer executable instructions. The instructions can be used to cause a general purpose or special purpose system, which is programmed with the instructions to perform the steps of the present invention. Alternatively, the steps of the present invention may be performed by specific hardware components that contain hard-wired logic for performing the steps, or by any combination of programmed computer components and custom hardware components.

A method of generating force feedback for an input and output ("I/O") device includes: monitoring multiple regions on a first surface of a flexible touch sensitive surface, wherein a second surface of the flexible touch sensitive surface is deposited over a flexible display; detecting a user input on a touched region of said plurality of regions; generating an input signal associated to said touched region and sending said input signal to a processing unit; and generating haptic feedback on said device in response to said input signal. The generating haptic feedback on said device in response to said input signal further includes: generating a partial imaging signal when said flexible display is in a flexible position; initiating a haptic signal in response to said input signal and said partial imaging signal; and providing said haptic signal to an actuator. The monitoring a plurality of regions on a first surface of a flexible touch sensitive surface further includes arranging said plurality of region in accordance with an image displayed by said flexible display and the detecting a user input on a touched region of said plurality of regions further includes receiving a touch by a user.

Figure 6:
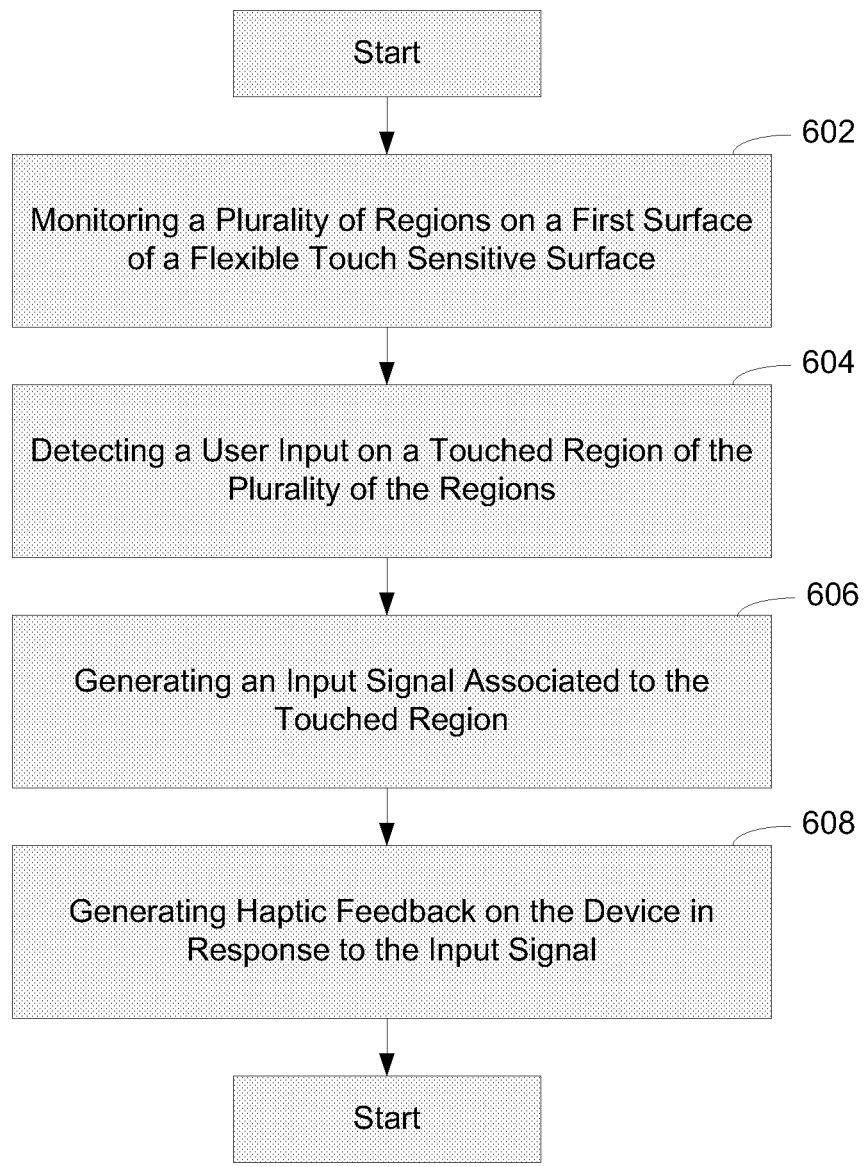
FIG. 6 is a flowchart illustrating a process of providing a haptic enabled flexible touch sensitive surface deposited over a flexible display in accordance with one embodiment of the present invention.

FIG. 6 is a flowchart illustrating a process of providing a haptic enabled flexible touch sensitive surface deposited over a flexible display in accordance with one embodiment of the present invention. At block 602, a process monitors a plurality of regions on a first surface of a flexible touch sensitive surface. The process arranges the plurality of regions of the flexible touch sensitive surface in accordance with a display window of a flexible display. The process, in one embodiment, determines the flexible position of the flexible display by reading sensors, and subsequently, uses the flexible position to determine an effective touch sensitive surface of the flexible touch sensitive surface. The second surface of said flexible touch sensitive surface is deposited over the flexible display. After block 602, the process moves to the next block.

At block 604, the process detects a user input from a touch or contact of a region on the flexible touch sensitive surface. When a user touches with a finger or stylus or pushes or presses a region of the flexible touch sensitive surface, the process detects a deformation of the region. Alternatively, some touch surfaces detect inputs by measuring capacitance change in response to a touch. An input is identified in response to the touched region and the graphic image displayed behind the touched region. After block 604, the process moves to the next block.

At block 606, the process generates an input signal associated to the touched region, and then sends the input signal to a processing unit. In one embodiment, the process continuously monitors and adjusts the size of the effective flexible touch sensitive surface since the flexible display can change continuously over a period of time. For example, when a flexible display changes from a planar position to a partially rolled up position, the effective display window needs to change accordingly. As such, the effective flexible touch sensitive surface is also adjusted in accordance with the display window. After block 606, the process proceeds to the next block.

At block 608, the process generates haptic feedback on the device in response to the input signal. In one embodiment, the process generates a partial imaging signal when the flexible display is in a flexible position. The process subsequently initiates a haptic signal in response to the input signal and the partial imaging signal. After the haptic signal is generated, the process forwards it to an actuator. In one embodiment, the process sets the flexible position when the flexible display is in a bending position. Alternatively, the process identifies the flexible position when the flexible display is in a rolled-up position. Also, the process identifies the flexible position when the flexible display is in a folding position. The process, in one embodiment, activates at least one strip (or fiber) of SMA to generate force feedback sensation. Alternatively, the process activates at least one fiber of EAP to create force feedback. In yet another embodiment, the process activates at least one strip of piezoelectric materials to create force feedback. After block 608, the process ends.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope all such changes and modifications as are within the true spirit and scope of this invention.

What is claimed is:

1. An electronic interactive device comprising:
a flexible touch sensitive surface configured to receive and locate a touch input during gross deformations of the flexible touch sensitive surface relative to a flat configuration of the flexible touch sensitive surface;
a flexible screen coupled to said flexible touch sensitive surface and configured for gross deformation with the flexible touch sensitive surface, the flexible screen configured to display an image during gross deformations of the flexible screen relative to a flat configuration of the flexible screen; and
a transparent flexible actuator layer configured for gross deformation with the flexible touch sensitive surface and said flexible screen, the transparent flexible actuator layer disposed between said flexible screen and said flexible touch sensitive surface, the transparent flexible actuator layer comprising a plurality of fibers of flexible actuators extending substantially parallel to the flexible touch sensitive surface, wherein each of said plurality of fibers of flexible actuators is attached at a different point of said flexible screen such that each of the plurality of fibers of flexible actuators delivers a unique haptic feedback effect to the flexible touch sensitive surface during gross deformations thereof in response to said input.

2. The electronic interactive device of claim 1, further comprising:
a flexible battery coupled to said flexible actuator and configured to provide power to said electronic interactive device; and
a flexible chip, coupled to said flexible battery, capable of processing data for displaying images on said flexible screen in response to said input, wherein said flexible chip further provides a haptic signal in response to said input for activating said flexible actuators to generate said haptic feedback.

3. The electronic interactive device of claim 1, wherein said flexible touch sensitive surface includes a bendable or a foldable touch sensitive surface, which further includes a plurality of flexible regions capable of receiving said input.

4. The electronic interactive device of claim 3, wherein said plurality of said flexible regions are capable of activating a set of said plurality of said flexible regions in response to a bending position of said flexible screen.

5. The electronic interactive device of claim 3, wherein said plurality of said flexible regions are capable of activating a set of said plurality of said flexible regions in response to a folding position of said flexible screen.

6. The electronic interactive device of claim 1, wherein said flexible screen is a rollable display, a foldable display, or a bendable electronic paper.

7. The electronic interactive device of claim 1, wherein said flexible actuators comprise fibers of Shape Memory Alloys, or electroactive polymers.

8. The electronic interactive device of claim 1, wherein said flexible screen, said flexible touch sensitive surface, and said flexible actuator layer are capable of rolling, folding, or bending at a substantially the same degree.

9. A method of providing haptic feedback for an input and output device, comprising:
monitoring a plurality of regions on a first surface of a flexible touch sensitive surface configured for operation during gross deformations relative to a flat configuration of the flexible touch sensitive surface, wherein a second surface of said flexible touch sensitive surface is disposed over a flexible display configured for gross deformations, the flexible display being configured to display an image during gross deformations relative to a flat configuration of the flexible display;
sensing a contact on one of said plurality of regions of said flexible touch sensitive surface;

generating an input signal in response to said contact and sending said input signal to a processing unit; and providing haptic feedback to the flexible touch sensitive surface in response to said input signal during the gross deformations relative to a flat configuration of the flexible touch surface;

wherein said haptic feedback is provided by a transparent flexible actuator layer disposed between the second surface of the touch sensitive surface and the flexible display, the transparent flexible actuator layer comprising a plurality of fibers of flexible actuators extending substantially parallel to the flexible touch sensitive surface, wherein each of said plurality of fibers of flexible actuators is attached at a different point of said flexible display such that each of the plurality of fibers of flexible actuators delivers a unique haptic feedback effect to the flexible touch sensitive surface during gross deformations thereof in response to said input.

10. The method of claim 9, wherein said providing haptic feedback in response to said input signal further includes:
generating a partial imaging signal when said flexible display is in a flexible position;
initiating a haptic signal in response to said input signal and said partial imaging signal; and
providing said haptic signal to said transparent flexible actuator layer.

11. The method of claim 9, wherein said monitoring a plurality of regions on a first surface of a flexible touch sensitive surface further includes:
identifying an effective displaying window of said flexible display if said flexible display is in a rolled-up position; and
activating a set of regions of said flexible touch sensitive surface to create an effective touch sensitive surface in response to said effective displaying window.

12. The method of claim 9, wherein said monitoring a plurality of regions on a first surface of a flexible touch sensitive surface further includes:
identifying an effective displaying window of said flexible display if said flexible display is in a folding position; and
activating a set of regions of said flexible touch sensitive surface to create an effective touch sensitive surface in response to said effective displaying window.

13. The method of claim 10, wherein said generating a partial imaging signal when said flexible display is in a flexible position further includes determining said flexible display is in a bending position.

14. The method of claim 10, wherein said generating a partial imaging signal when said flexible display is in a flexible position further includes determining said flexible display is in a rolled-up position.

15. The method of claim 10, wherein said generating a partial imaging signal when said flexible display is in a flexible position further includes determining said flexible display is in a folding position.

16. The method of claim 9, wherein said providing haptic feedback further includes activating at least one fiber of shape memory alloy to create a haptic sensation.

17. The method of claim 9, wherein said providing haptic feedback further includes activating at least one fiber of electroactive polymers to create a haptic sensation.

18. A handheld device having a flexible screen, comprising:
a flexible touch sensitive surface configured to receive and locate a touch input during gross deformations of the flexible touch sensitive surface relative to a flat configuration of the flexible touch sensitive surface;

a flexible screen configured for gross deformation with the flexible touch sensitive surface, the flexible screen configured to display an image in response to said input during gross deformations of the flexible screen relative to a flat configuration of the flexible screen;

a first handle coupled to first end of said flexible screen and a second handle coupled to second end of said flexible screen, wherein when said first handle and said second handle are in closed position, said flexible screen is in a rolled-up position, and when first handle and second handle are in open position, said flexible screen is in a displaying position; and a transparent flexible actuator layer configured for gross deformation with the flexible touch sensitive surface and said flexible screen, the transparent flexible actuator layer disposed between and coupled to the flexible screen and the flexible touch sensitive surface, the transparent flexible actuator layer comprising a plurality of fibers of flexible actuators extending substantially parallel to the flexible touch sensitive surface, wherein each of said plurality of fibers of flexible actuators is attached at a different point of said flexible screen such that each of the plurality of fibers of flexible actuators delivers a unique haptic feedback effect to the flexible touch sensitive surface during gross deformations thereof in response to said input.

19. The handheld device of claim 18, wherein said flexible touch sensitive surface further includes at least a portion of said flexible touch sensitive surface deposited over said first handle.

20. The handheld device of claim 19, wherein said flexible touch sensitive surface further includes at least a portion of said flexible touch sensitive surface deposited over said second handle.

21. The handheld device of claim 20, wherein said flexible touch sensitive surface further includes at least a portion of said flexible touch sensitive surface deposited over said flexible screen.

22. An apparatus for providing force feedback for an input and output device, comprising:
means for monitoring a plurality of regions on a first surface of a flexible touch sensitive surface configured for operation during gross deformations of the flexible touch sensitive surface relative to a flat configuration of the flexible touch sensitive surface, wherein said flexible touch sensitive surface is disposed over a flexible display configured for gross deformation with the flexible touch sensitive surface, the flexible display being configured to display an image during gross deformations of the flexible display relative to a flat configuration of the flexible display;

means for detecting an input on a touched region of said plurality of regions;

means for generating an input signal associated to said touched region and sending said input signal to a processing unit; and transparent flexible means for generating haptic feedback on said device, the transparent flexible means for generating haptic feedback being disposed between the flexible touch sensitive surface and the flexible display and being configured for gross deformation with the flexible touch sensitive surface and the flexible display, and being configured to provide said haptic feedback to the flexible touch sensitive surface in response to said input signal during gross deformations of the transparent flexible means for generating haptic feedback in response to said input signal;

wherein said transparent flexible means for generating haptic feedback comprises a flexible actuator layer comprising a plurality of fibers of flexible actuators extending substantially parallel to the flexible touch sensitive surface, wherein each of said plurality of fibers of flexible actuators is attached at a different point of said flexible display such that each of the plurality of fibers of flexible actuators delivers a unique haptic feedback effect to the flexible touch sensitive surface during gross deformations thereof in response to said input signal.

23. The apparatus of claim 22, wherein said transparent flexible means for generating haptic feedback on said device in response to said input signal further includes:

means for generating a partial imaging signal when said flexible display is in a flexible position;

means for initiating a haptic signal in response to said input signal and said partial imaging signal; and means for providing said haptic signal to said flexible actuator layer.

24. A system comprising a flexible touch sensitive display device having a flexible touch sensitive surface portion configured for operation during gross deformations relative to a flat configuration of the touch sensitive surface portion, a flexible screen portion configured to display an image during gross deformations relative to a flat configuration of the flexible screen portion, and a transparent flexible actuator portion configured for operation during gross deformations relative to a flat configuration of the flexible actuator, the flexible touch sensitive portion, the flexible screen portion, and the transparent flexible actuator configured to flex and grossly deform together, wherein:

said touch sensitive surface portion is capable of receiving an input, said flexible screen portion is configured to display an image, and said transparent flexible actuator portion is disposed between said flexible touch sensitive surface and said flexible screen portion, and is configured to provide haptic feedback to the touch sensitive surface portion in response to said input during gross deformations, and said transparent flexible actuator portion comprises a layer comprising a plurality of fibers of flexible actuators extending substantially parallel to the flexible touch sensitive surface portion, wherein each of said plurality of fibers of flexible actuators is attached at a different point of said flexible screen portion such that each of the plurality of fibers of flexible actuators delivers a unique haptic feedback effect to said touch sensitive surface portion during gross deformations thereof in response to said input.

25. The system of claim 24, further comprising:

a power supply coupled to said transparent flexible actuator portion and configured to provide power to said system; and a chip, coupled to said power supply, capable of processing data for displaying images on said screen portion in response to said input.

26. The system of claim 25, wherein said chip further provides a haptic signal in response to said input for activating said flexible actuator portion to generate said haptic feedback.

27. The system of claim 24, wherein said flexible touch sensitive display device is rollable, bendable or foldable.

28. The system of claim 25, wherein said power supply is a flexible battery.

29. The system of claim 25, wherein said power supply includes a plurality of solar cells or photovoltaic cells, which convert light energy into electric energy.

30. The electronic interactive device of claim 1, further comprising a second flexible actuator layer disposed on an opposite side of the flexible screen relative to the transparent flexible actuator layer, the second flexible actuator layer comprising thin strips or fibers of flexible actuators extending substantially parallel to the flexible touch sensitive surface.

31. The method of claim 9, wherein said wherein said haptic feedback is further provided by a second flexible actuator layer disposed on an opposite side of the flexible screen relative to the transparent flexible actuator layer, the second flexible actuator layer comprising thin strips or fibers of flexible actuators extending substantially parallel to the flexible touch sensitive surface.

32. The apparatus of claim 22, further comprising a second flexible actuator layer disposed on an opposite side of the flexible screen relative to the transparent flexible actuator layer, the second flexible actuator layer comprising thin strips or fibers of flexible actuators extending substantially parallel to the flexible touch sensitive surface.

33. The system of claim 24, further comprising a second flexible actuator layer disposed on an opposite side of the flexible screen relative to the transparent flexible actuator layer, the second flexible actuator layer comprising thin strips or fibers of flexible actuators extending substantially parallel to the flexible touch sensitive surface.

34. The electronic interactive device of claim 1, wherein the plurality of fibers of flexible actuators are attached and extend only along edges of said flexible screen to reduce interference of images displayed on said flexible screen.

35. The method of claim 9, wherein the plurality of fibers of flexible actuators are attached and extend only along edges of said flexible display to reduce interference of images displayed on said flexible display.

36. The apparatus of claim 22, wherein the plurality of fibers of flexible actuators are attached and extend only along edges of said flexible display to reduce interference of images displayed on said flexible display.

37. The system of claim 24, wherein the plurality of fibers of flexible actuators are attached and extend only along edges of said flexible screen portion to reduce interference of images displayed on said flexible screen portion.

* * * * *